United States Patent [19]

Binkley

[11] Patent Number: 4,564,797

[45] Date of Patent: Jan. 14, 1986

[54] VEHICLE STORAGE BATTERY SYSTEM

[75] Inventor: Bruce I. Binkley, King County, Wash.

[73] Assignee: Energy Exchange Systems, Seattle, Wash.

[21] Appl. No.: 602,139

[22] Filed: Apr. 19, 1984

Related U.S. Application Data

[63] Continuation-in-part of Ser. No. 580,618, Feb. 16, 1984.

[51] Int. Cl.⁴ .............................. H02J 7/00; H02J 7/14
[52] U.S. Cl. ........................................... 320/2; 320/7; 320/16
[58] Field of Search ........................................ 320/2–4, 320/6, 7, 8, 15, 16

[56] References Cited

U.S. PATENT DOCUMENTS

| | | | |
|---|---|---|---|
| 1,924,959 | 8/1933 | Patterson, Jr. | 320/7 |
| 2,044,917 | 6/1936 | Richardson . | |
| 2,066,010 | 12/1936 | Lindem | 320/7 X |
| 3,309,598 | 3/1967 | Montgomery et al. | 320/2 |
| 3,376,402 | 4/1968 | Bednarski | 200/157 |
| 3,463,995 | 8/1969 | Herold | 320/6 |
| 3,504,262 | 3/1970 | Sada et al. | 320/6 |
| 3,534,354 | 10/1970 | Galginaitis | 320/48 X |
| 3,694,729 | 9/1972 | Jones | 320/2 X |
| 3,763,415 | 10/1973 | Ownby | 320/6 |
| 3,896,364 | 7/1975 | Reister | 320/2 |
| 3,949,289 | 4/1976 | Day | 320/6 X |
| 4,004,208 | 1/1977 | Tamminen | 320/2 |
| 4,006,397 | 2/1977 | Cototti et al. | 320/39 X |
| 4,069,451 | 1/1978 | Rouse | 322/1 |
| 4,092,580 | 5/1978 | Prinsze | 320/2 |
| 4,258,305 | 3/1981 | Anglin | 320/2 |
| 4,264,855 | 4/1981 | Ghibaudo et al. | 320/6 |
| 4,398,139 | 8/1983 | Prinsze | 320/2 |

Primary Examiner—R. J. Hickey
Attorney, Agent, or Firm—Seed and Berry

[57] ABSTRACT

A vehicle storage battery system having a storage battery with three integrally manufactured separate storage battery portions, a battery control and a switch for selecting between the operating states for the system. The storage battery has a main battery portion with a capacity sufficient for starting the engine of a vehicle under normal circumstances, a first standby battery portion and a second standby battery portion. The first and second standby battery portions when connected in series have a combined voltage and current output which is greater than the voltage and current output of the main battery portion when in a discharge state. The voltage and current output of the first and second standby battery portions each are less than the main battery portion when the standby battery portions are connected in parallel. The battery control has a first circuit connecting the first and second standby battery portions in series for charging the main battery portion when in a discharged state, and a second circuit connecting the first and second standby battery portions in parallel for recharging the standby battery portions from the main battery portion. The first circuit includes a limiting resistive element connected in series with the first and second standby battery portions for restricting the charging current flow from the standby battery portions to the main battery portion to a predetermined safe level. The second circuit includes a voltage regulator and a limiting resistive element connected to each of the first and second standby battery portions to provide a constant, uniform recharging voltage to each of the standby battery portions and to restrict the recharging current flow to the standby battery portions to a predetermined safe level. The system is provided with a galvanometer for indicating the flow of charging current to the main battery portion. The battery control may be connected to the storage battery by a cable for remote operational control of the system.

16 Claims, 2 Drawing Figures

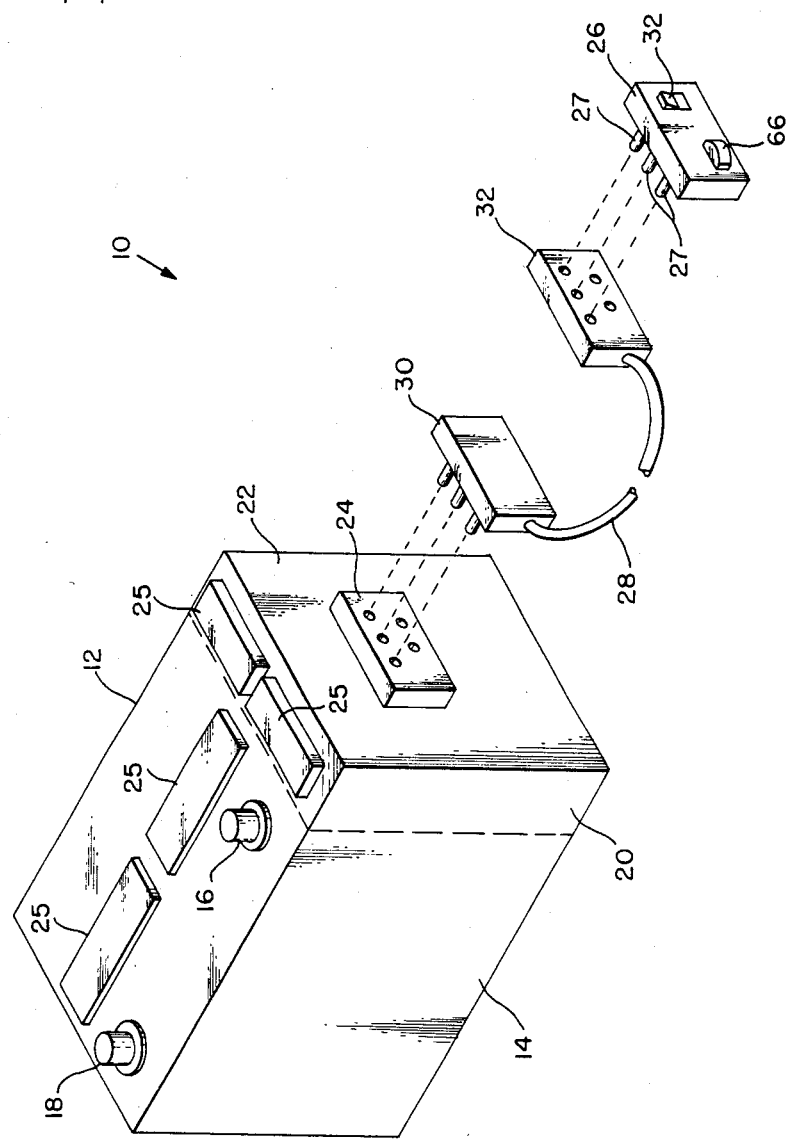

VEHICLE STORAGE BATTERY SYSTEM

RELATED APPLICATION

This is a continuation-in-part of pending application Ser. No. 06/580,618, filed Feb. 16, 1984.

TECHNICAL FIELD

This invention relates generally to vehicle storage batteries, and more particularly to a vehicle storage battery system for internal combustion engines with an emergency power supply and control for starting of the engine when the battery is in a discharged state.

BACKGROUND ART

A motor vehicle storage battery sometimes falls into a state of discharge such that it cannot deliver sufficient current to the starter motor. This occurs most commonly due to excessive current drain, insufficient charging time and severe environmental conditions.

To start a vehicle whose storage battery has run down requires either bypassing the electrical starting system entirely, or supplying the system with an additional source of electrical power. The former is generally accomplished by push-starting the vehicle, the latter by using jumper cables. Push starting requires assistance in the form of a push vehicle or muscle power. Additionally, only cars fitted with standard transmissions can be effectively push started. Jump starting also requires the aid of an additional vehicle. Further, cables must be available and must be externally connected, requiring the user to exit the vehicle and be exposed to the hazards of a possible battery explosion and associated mishaps as a result of misconnection.

Several self-contained means for charging a vehicle's inoperative battery to enable the vehicle to start have been developed. U.S. Pat. No. 4,004,208, issued to Tamminen, discloses a starting aid which may be carried within a vehicle to provide an emergency power source. This starting aid, as do many others, requires separate batteries be provided which are carries inside the vehicle's passenger compartment. Other devices are known in the art, including those disclosed in U.S. Pat. No. 3,504,262, issued to Sada et al, U.S. Pat. No. 4,258,305, issued to Anglin, and U.S. Pat. No. 3,763,415, issued to Ownby. These all require either a connection to an external power source, or several separate batteries be provided. Such arrangements are expensive, utilize excessive space, or are not suitable for easy reuse should the starter battery become discharged repeatedly.

DISCLOSURE OF INVENTION

The present invention resides in a vehicle storage battery system for an internal combustion engine which provides a starter battery with an emergency power supply for starting of the engine should the starter battery become discharged. The system includes a storage battery having three integrally manufactured separate storage battery portions, including a main battery portion having a capacity sufficient for starting the engine of the vehicle under normal circumstances, a first standby battery portion and a second standby battery portion. The first and second standby battery portions when connected in series have a combined voltage and current output which is greater than the voltage and current output of the main battery portion when in a discharge state. The voltage and current output of the first and second standby battery portions each are less than the main battery portion when the first and second battery standby portions are connected in parallel.

The system further includes a battery control means for selectively connecting the first and second standby battery portions in series for charging the main battery portion when in a discharged state, and connecting the first and second standby battery portions in parallel for recharging the standby battery portions from the main battery portion. The battery control means has a first circuit for connecting the standby battery portions in series, and a second circuit for connecting the standby battery portions in parallel. The first circuit has means for restricting a charging current flow from the standby battery portions to the main battery portion to a predetermined safe level, and the second circuit has means for restricting a recharging current flow to the standby battery portion to a predetermined safe level. The system further includes switch means for selectively switching between the first and second circuits.

The system also has indicator means in the first circuit for indicating the flow of charging current to the main battery portion from the first and second standby battery portions. The indicator means is a galvanometer.

A cable is provided which connects the battery control to the storage battery for remote operational control of the system. The battery control is electrically connected to the storage battery through an externally accessible connector panel attached to a case for the storage battery. The terminals of the connector panel are connected to the terminals of the main battery portion and the standby battery portions, through connections made internal of the battery case. The main battery portion and the first standby battery portion have their negative terminals connected together internally.

The second circuit has voltage regulator means for providing a constant and uniform recharging voltage to the first and second standby battery portions. The voltage regulator means includes a voltage regulator connected to each of the first and second standby battery portions to regulate the voltage applied thereto by the main battery portion when the second circuit is selected by the switch means for recharging the standby battery portions. The means for restricting the recharging current flow to the standby battery portions restricts the flow to a rate which is approximately two-tenths of the rated output capacity of the standby battery portions. The means used is a limiting resistive element connected between each of the voltage regulators and its respective standby battery portion.

The means for restricting the charging current flow to the main battery portion is a limiting resistive element connected in series with the first and second standby battery portions.

Other features and advantages of the invention will become apparent from the following detailed description, taken in conjunction with the accompanying drawings.

BRIEF DESCRIPTION OF THE DRAWINGS

FIG. 2 is an isometric view of the storage battery of the system of FIG. 1, showing an interconnect cable for connecting a battery control to the storage battery of the system.

BEST MODE FOR CARRYING OUT THE INVENTION

Figure 1:
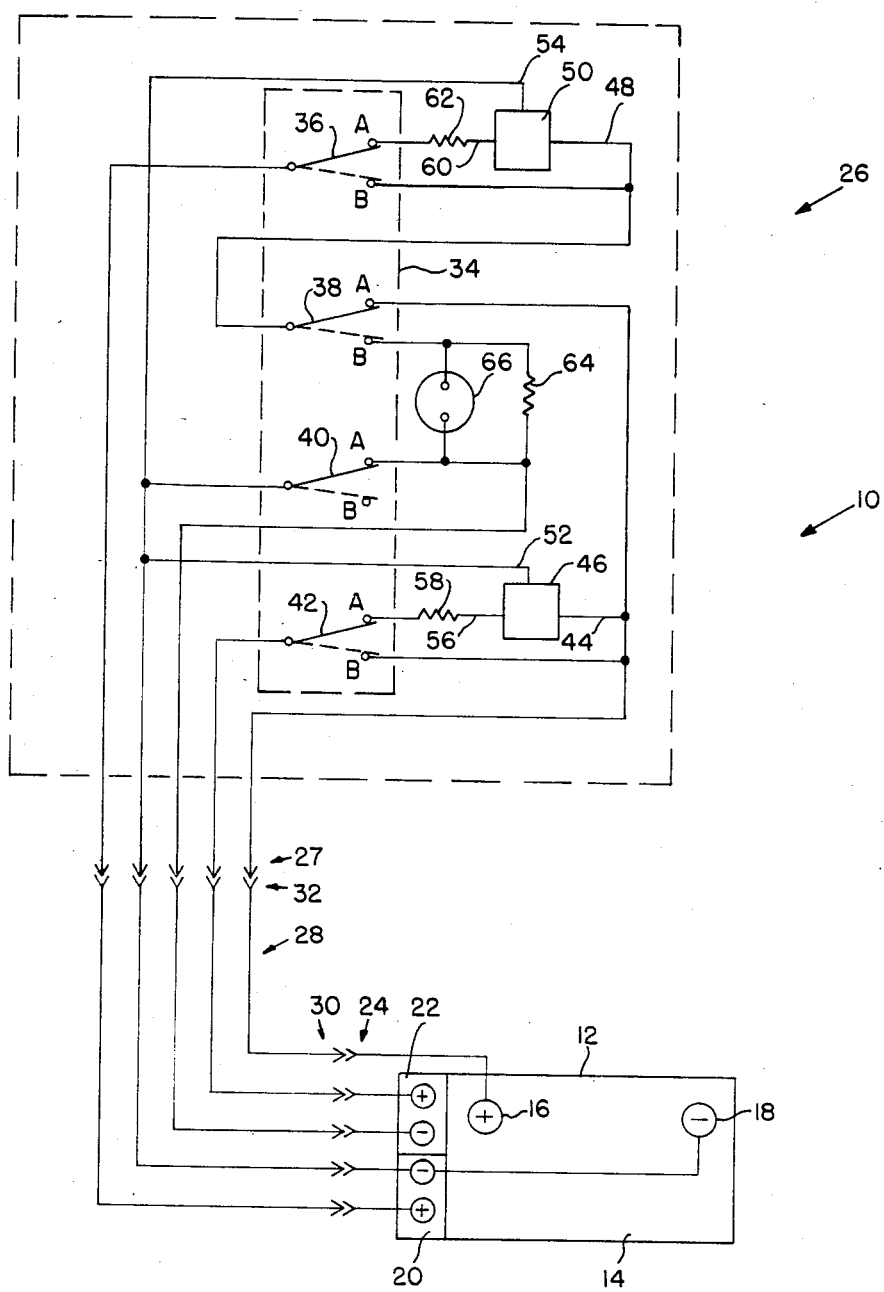
FIG. 1 is an electrical schematic diagram of the vehicle storage battery system of the present invention.

As shown in the drawings for purposes of illustration, the present invetion is embodied in a vehicle storage battery system, indicated generally by reference numeral 10. The system 10 includes a storage battery 12 of the low internal resistance lead-acid type having three separate storage battery portions manufactured as an integral unit. A main battery portion 14 provides a nominal voltage of twelve (12) volts across its positive and negative terminals 16 and 18, respectively, and has sufficient current capacity under normal conditions to operate a starter motor to start an internal combustion engine. The battery 12 is carried in the engine compartment of a vehicle and replaces the normal starter storage battery.

The terminals 16 and 18 of the main battery portion 14 are connectable in the usual fashion to the vehicle starter motor and supply the power to start the engine. The battery 12 further includes a first standby battery portion 20 and a second standby battery portion 22, each having a nominal voltage across its positive and negative terminals of eight (8) volts and a rated output capacity of about five (5) amphere-hours. The positive and negative terminals of the first and second standby battery portions 20 and 22 are connected to a connector panel 24 mounted on an outside wall of the battery 12. The positive terminal 16 of the main batterey portion 14 is also connected to the connector panel 24. The negative terminal of the first standby battery portion 20 and the negative terminal of the main battery portion 14 are connected together internally to provide a common ground. As illustrated in FIG. 2, the main battery portion 14 and the standby battery portions 20 and 22 may have ports and caps 25 therefor by which the fluid levels in the cells of the battery 12 are maintained at appropriate levels. In the alternative, the battery 12 may be manufactured as a maintenance-free battery.

The system 10 of the present invention further includes a battery controller 26, shown in FIG. 1 bounded by a dashed line, for controlling the operation of the battery 12. The controller 26 is manufactured with its external leads connected to connector pins 27. An interconnect cable 28 is provided with a mating connector 30 on one end to plug into the connector panel 24 of the battery 12, and a mating connector 32 on the other end to receive the connector pins 27 of the controller 26. The interconnect cable 28 allows the controller 26 to control the battery 12 from a remote location inside the vehicle's passenger compartment. In the alternative, the controller 26 may be plugged directly into the battery connector panel 24 requiring the user to have access to the battery 12 for its control.

The controller 26 has a first circuit connecting the first and second standby battery portions 20 and 22 in series for charging of the main battery portion 14 when it is in a discharged state. The control 26 further includes a second circuit connecting the first and second standby battery portions 20 and 22 in parallel for recharging of the standby battery portions from the main battery portion 14 after the vehicle's engine has been started and as the main battery portion is being recharged by the generator or alternator of the vehicle. A four-pole, double-throw switch 34 is provided as part of the controller 26 for switching between the first and second circuits.

The switch 34 has first, second, third and fourth poles 36, 48, 40 and 42, respectively. With the switch 34 thrown to active the second circuit, the first, second, third and fourth poles 36, 38, 40 and 42 of the switch are each positioned to contact a terminal indicated in FIG. 1 by the letter "A". When the switch 34 is thrown to activate the first circuit, the first, second, third and fourth poles 36, 38, 40 and 42 are each positioned to contact a terminal indicated in FIG. 1 by the letter "B".

By throwing the switch 34 to activate the second circuit, the first and second standby battery portions 20 and 22 are connected in parallel for recharging from the main battery portion 14. The positive terminal 16 of the main battery portion 14 is connected to an input lead 44 of a first nine and four-tenths (9.4) volt voltage regulator 46, and is also connected to terminal A of the second pole 38 of the switch 34. The second pole 38 is connected to an input lead 48 of a second nine and four-tenths (9.4) volt voltage regulator 50. A ground lead 52 of the first voltage regulator 46 and a ground lead 54 of the second voltage regulator 50 are connected together internal of the controller 26 and to the negative terminal of the first standby battery portion 20, which as described above, is connected to the negative terminal 18 of the main battery portion 14 by an internal battery connection.

An output lead 56 of the first voltage regulator 46 is connected through a current limiting resistor 58 to terminal A of the fourth pole 42 of the switch 34. The fourth pole 42 is connected to the positive terminal of the second standby battery portion 22, thus the first voltage regulator 46 provides a constant and uniform recharging voltage to the second standby battery portion. Furthermore, the resistor 58 restricts the flow of recharging current to the second standby battery portion 22 to a rate which is approximately two-tenths (0.2) of the rated output capacity of the second standby battery portion. This limits the recharging current to a trickle charge and thereby avoids a dangerous recharging condition.

Similarly, an output lead 60 of the second voltage regulator 50 is connected through a current limiting resistor 62 to terminal A of the first pole 36 of the switch 34. The first pole 36 is connected to the positive terminal of the first standby battery portion 20. The second voltage regulator 50 provides a constant and uniform recharging voltage to the first standby battery portion 20, and the resistor 62 restricts the flow of recharging current to the first standby battery portion to a rate which is approximately two-tenths (0.2) of the rated output capacity of the first standby battery portion 20. In the presently preferred embodiment of the invention, the first and second standby battery portions 20 and 22 are designed with an approximately five amphere-hour rated output capacity. The negative terminals of the first and second standby battery portions 20 and 22 are connected together through the third pole 40 of the switch 34, and connected to the negative terminal of the main battery portion 14 through the internal connection between the negative terminals of the first standby battery portion and the main battery portion, thus providing a common ground connection between all negative terminals of the system 10.

In conventional manner, the main battery portion 14 is connected through the vehicle's voltage regulator means (not shown) to the alternator or generator of the vehicle to maintain the main battery portion 14 charged during normal operation of the vehicle. In the event that the main battery portion 14 should fall into a state of discharge in which it has an insufficient current and voltage supply to start the engine of the vehicle, the switch 34 is thrown to activate the first circuit and move the first, second, third and fourth poles 36, 38, 40 and 42 to contact their respective "B" terminals. As will now be described in detail, this places the first and second standby battery portions 20 and 22 in an in series configuration and provide a nominal voltage of sixteen (16) volts to the main battery portion 14 for charging of the main battery portion. Since the nominal voltage of the vehicle battery is twelve (12) volts, the voltage difference allows current to flow from the first and second standby battery portions 20 and 22 to the main battery portion 14 a sufficient charge is transferred in a relatively short period of time to permit the main battery portion 14 to start the vehicle's engine.

With the switch 34 thrown to activate the first circuit, the first pole 36 connects the positive terminal of the first standby battery portion 20 to the second pole 38. The terminal B of the second pole 38 is connected through a limiting resistor 64 to the negative terminal of the second standby battery portion 22. The resistor 64 limits the charging current to the main battery portion 14 to a rate which is approximately two-tenths (0.2) of the rated output capacity of the main battery portion to avoid a dangerous charging condition occurring. Bridging the limiting resistor 64 and in parallel therewith, is a galvanometer 66 which indicates the flow of charging current to the main battery portion 14 from the first and second standby battery portions 20 and 22. The positive terminal of the second standby battery portion 22 is connected through the fourth pole 42 to the positive terminal 16 of the main battery portion 14 to complete the series circuit. It is noted that with the switch 34 thrown to activate the first circuit and thereby place the first and second standby battery portions 20 and 22 in series for charging of main battery portion 14, the voltage regulators 46 and 50 are effectively removed from the circuit.

In operation, the battery 12 is maintained in the usual fashion by keeping the fluid in the main battery portion 14 and the standby battery portions 20 and 22 at the proper levels. The switch 34 is normally thrown to activate the second circuit so the standby battery portions 20 and 22 are in a parallel configuration for recharging from the main battery portion 14, and thus maintained fully charged. Should the main battery portion 14 fall into a state of discharge where it will not start the vehicle's engine, the user need only throw the switch 34 to activate the first circuit and place the standby battery portions 20 and 22 in an in series configuration for charging of the main battery portion 14. If the interconnect cable 28 is used and the controller 26 is positioned within the passenger compartment of the vehicle, the user does not have to leave the vehicle. If the cable 28 is not used and the controller 26 is plugged directly into the control panel 24 on the battery 12, the user must get out and raise the hood of the vehicle to gain access to the switch 34. After the switch 34 is thrown, the user must wait only a relatively short time, typically from two to ten minutes, depending on the degree of discharge of the main battery portion 14, for the standby battery portions 20 and 22 to transfer sufficient charge to the main battery portion for it to be able to start the vehicle's engine. After the engine is started, the switch 34 is returned to the position which activates the second circuit and places the standby battery portions 20 and 22 in the parallel configuration for recharging from the main battery portion 14. The running of the vehicle engine will allow the generator or alternator of the vehicle to fully recharge the main battery portion 14 from which the standby battery portions 20 and 22 are recharged so they will be ready for use again should the main battery portion fall into a discharge state.

The storage battery system 10 of the present invention allows the use of high capacity, low maintenance, durable and repeatably rechargeable lead-acid standby batteries built integral with the main starter battery for providing an emergency power supply to charge the starter battery. This provides a safe, economical and always ready emergency power supply which can be built into the starter battery used by every automobile and conveniently used without the need for the purchase or carrying of separate batteries, jumper cables or other battery charging devices inside the passenger compartment of the vehicle.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A vehicle storage battery system, comprising:
    a storage battery having three integrally manufactured separate storage battery portions, including a main battery portion having a capacity sufficient for starting the engine of a vehicle under normal circumstances, a first standby battery portion and a second standby battery portion, said first and second standby battery portions when connected in series having a combined nominal voltage which is greater than the voltage of said main battery portion, said nominal voltage of said first and second standby battery portions each being less than the nominal voltage of said main battery portion, said first and second standby battery portions having a rated capacity smaller than said main battery portion but sufficient to transfer enough charge to said main battery portion when in a discharged state to start the engine of the vehicle;
    a battery control having a first circuit connecting said first and second standby battery portions in series for charging said main battery portion when in a discharged state, said first circuit including means for restricting a charging current flow from said standby battery portions to said main battery portion to a predetermined safe level, and a second circuit connecting said first and second standby battery portions in parallel for recharging said standby battery portions from said main battery portion, said second circuit including means for restricting a recharging current flow to said standby battery portions to a predetermined safe level; and
    switch means for switching between said first and second circuits.

2. The vehicle storage battery system of claim 1, further including indicator means in said first circuit for indicating the flow of charging current to said main battery portion from said first and second standby battery portions.

3. The vehicle storage battery system of claim 2 wherein said indicator means includes a galvanometer.

4. The vehicle storage battery system of claim 1 wherein said battery control is connected to said storage battery by a cable for remote operational control of said vehicle storage battery system.

5. The vehicle storage battery system of claim 1 wherein said second circuit includes voltage regulator means for providing a constant and uniform recharging voltage to said first and second standby battery portions.

6. The vehicle storage battery system of claim 1 wherein said means for restricting said recharging current flow to said standby battery portions restricts said flow to a rate which is approximately two-tenths of the rated output capacity of said standby battery portions.

7. The vehicle storage battery system of claim 1 wherein said battery control is electrically connected to said storage battery through an externally accessible connector attached to a case for said storage battery, the terminals of said connector being connected to the terminals of said main battery portion and said standby battery portions internal of said battery case.

8. The vehicle storage battery system of claim 7 wherein said main battery portion and said first standby battery portion have their negative terminals connected together internally.

9. The vehicle storage battery system of claim 1 wherein each of said first and second standby battery portions is connected to a voltage regulator to regulate the voltage applied thereto by said main battery portion when said second circuit is selected by said switch means for recharging said first and second standby battery portions.

10. The vehicle storage battery system of claim 9 wherein said means for restricting said recharging current flow to said standby battery portions is a limiting resistive element connected between each of said voltage regulators and its respective standby battery portion.

11. The vehicle storage battery system of claim 1 wherein said means for restricting said charging current flow to said main battery portion is a limiting resistive element connected in series with said first and second standby battery portions.

12. A vehicle storage battery system, comprising:
a storage battery having three integrally manufactured separate storage battery portions, including a main battery portion having a capacity sufficient for starting the engine of a vehicle under normal circumstances, a first standby battery portion and a second standby battery portion, said first and second standby battery portions when connected in series having a combined normal voltage which is greater than the voltage of said main battery portion, said nominal voltage of said first and second standby battery portions each being less than the nominal voltage of said main battery portion, said first and second standby battery portions having a rated capacity smaller than said main battery portion but sufficient to transfer enough charge to said main battery portion when in a discharged state to start the engine of the vehicle;
battery control means for selectively connecting said first and second standby battery portions in series for charging said main battery portion when in a discharged state, or connecting said first and second standby battery portions in parallel for recharging said standby battery portions from said main battery portion, said control means including means for restricting a charging current flow from said standby battery portions to said main battery portion to a predetermined safe level, and means for restricting a recharging current flow to said standby battery portions to a predetermined safe level; and
switch means for selectively switching between connecting said first and second standby battery portions in series or in parallel.

13. The vehicle storage battery system of claim 12, further including indicator means for indicating the flow of charging current to said main battery portion from said first and second standby battery portions.

14. The vehicle storage battery system of claim 12, further including voltage regulator means for providing a constant and uniform recharging voltage to said first and second standby battery portions.

15. The vehicle storage battery system of claim 12 wherein said means for restricting said recharging current flow to said standby battery portions restricts said flow to a rate which is approximately two-tenths of the rated output capacity of said standby battery portions.

16. The vehicle storage battery system of claim 12 wherein said means for restricting said charging current flow to said main battery portion is a limiting resistive element connected in series with said first and second standby battery portions.

* * * * *